United States Patent
Helot et al.

(10) Patent No.: US 6,814,416 B2
(45) Date of Patent: Nov. 9, 2004

(54) STABILIZER MECHANISMS FOR COMPUTER RELATED EQUIPMENT

(75) Inventors: Jacques H Helot, Grenoble (FR); Gilbert Rahmouni, Claix (FR)

(73) Assignee: Hewlett-Packard Development Company L.P., Houston, TX (US)

(*) Notice: Subject to any disclaimer, the term of this patent is extended or adjusted under 35 U.S.C. 154(b) by 9 days.

(21) Appl. No.: 10/265,906

(22) Filed: Oct. 8, 2002

(65) Prior Publication Data

US 2003/0076018 A1 Apr. 24, 2003

(30) Foreign Application Priority Data

Oct. 9, 2001 (EP) .............................. 01410127

(51) Int. Cl.[7] .............................................. A47B 81/00
(52) U.S. Cl. ................... 312/223.2; 248/188.1; 248/677; 312/351.1
(58) Field of Search .................... 312/223.2, 351.1; 248/677, 188, 188.1

(56) References Cited

U.S. PATENT DOCUMENTS

| | | | |
|---|---|---|---|
| 4,856,748 A | * 8/1989 | Obermeyer | ................. 248/688 |
| 5,020,768 A | 6/1991 | Hardt et al. | ................. 248/678 |
| 5,918,957 A | * 7/1999 | Bovio et al. | ............. 312/223.2 |
| 6,016,248 A | 1/2000 | Anzai et al. | ................. 361/683 |
| 6,311,941 B1 | * 11/2001 | Feldmeyer | ................. 248/188.8 |
| 6,496,365 B2 | * 12/2002 | Tsai | ........................... 361/686 |

* cited by examiner

*Primary Examiner*—Ramon O. Ramirez
(74) *Attorney, Agent, or Firm*—Lowe Hauptman Gilman & Berner, LLP

(57) ABSTRACT

A stabilizer mechanism pivotally attached to a computer casing wall includes retractable spring loaded extension arms which, in a stabilizing position, extend to increase the effective casing footprint while the retractable extension arms are in a storage position. The stabilizer is pivotable into a retraction position within the casing. The stabilizer includes a flat panel attached so its freedom of rotation is limited to support the casing in an elevated position. The retractable extension arms include a mechanism for securing them within the stabilizer. Alternatively, a removable stabilizer is stored in a recess within the casing. In the stabilizing position, the stabilizer is released from the storage recess and oriented in the stabilizing position by rotating the stabilizer until it is at right angles to its storage position. Pressing the stabilizer into the recess locks it in position to elevate the computer casing.

12 Claims, 2 Drawing Sheets

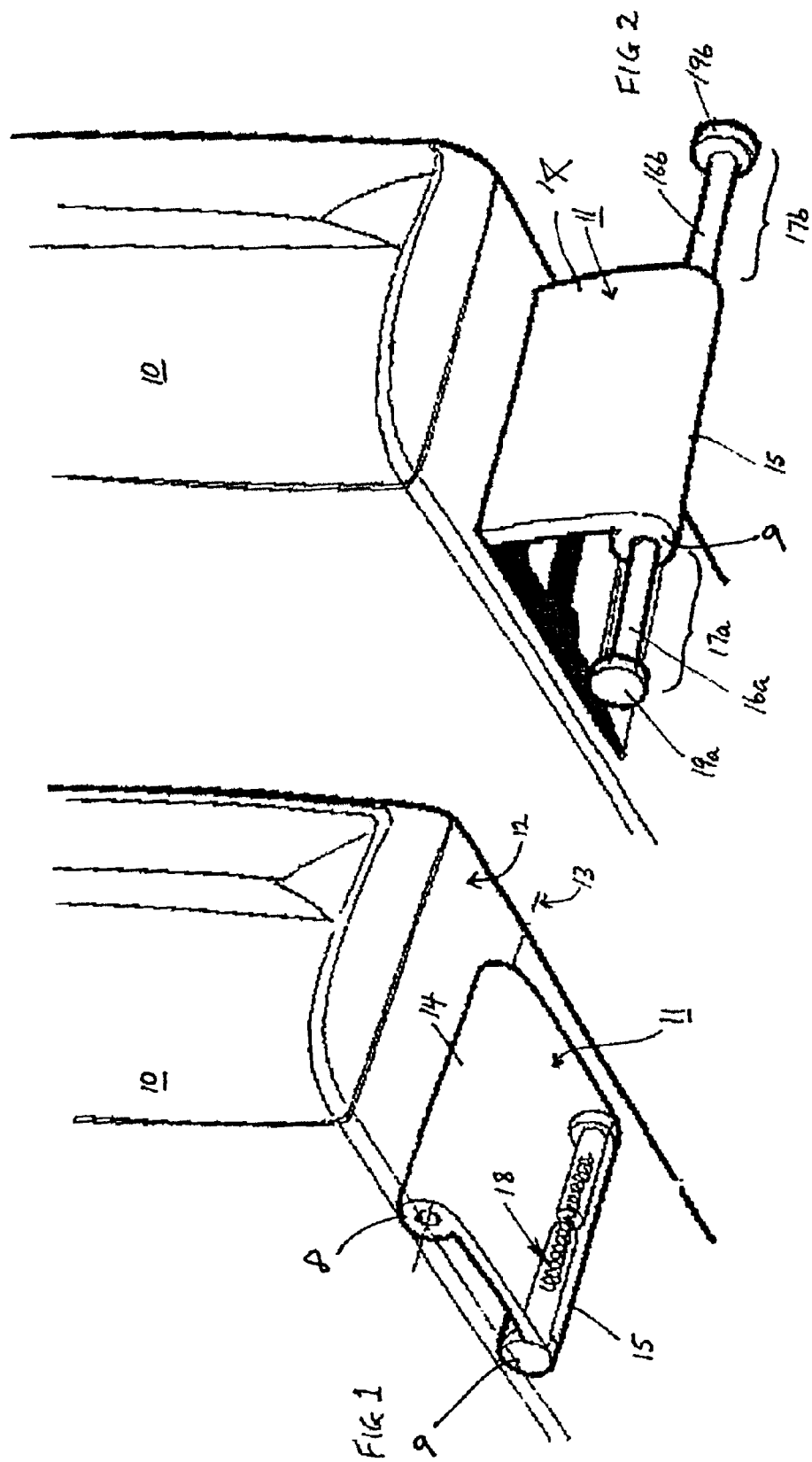

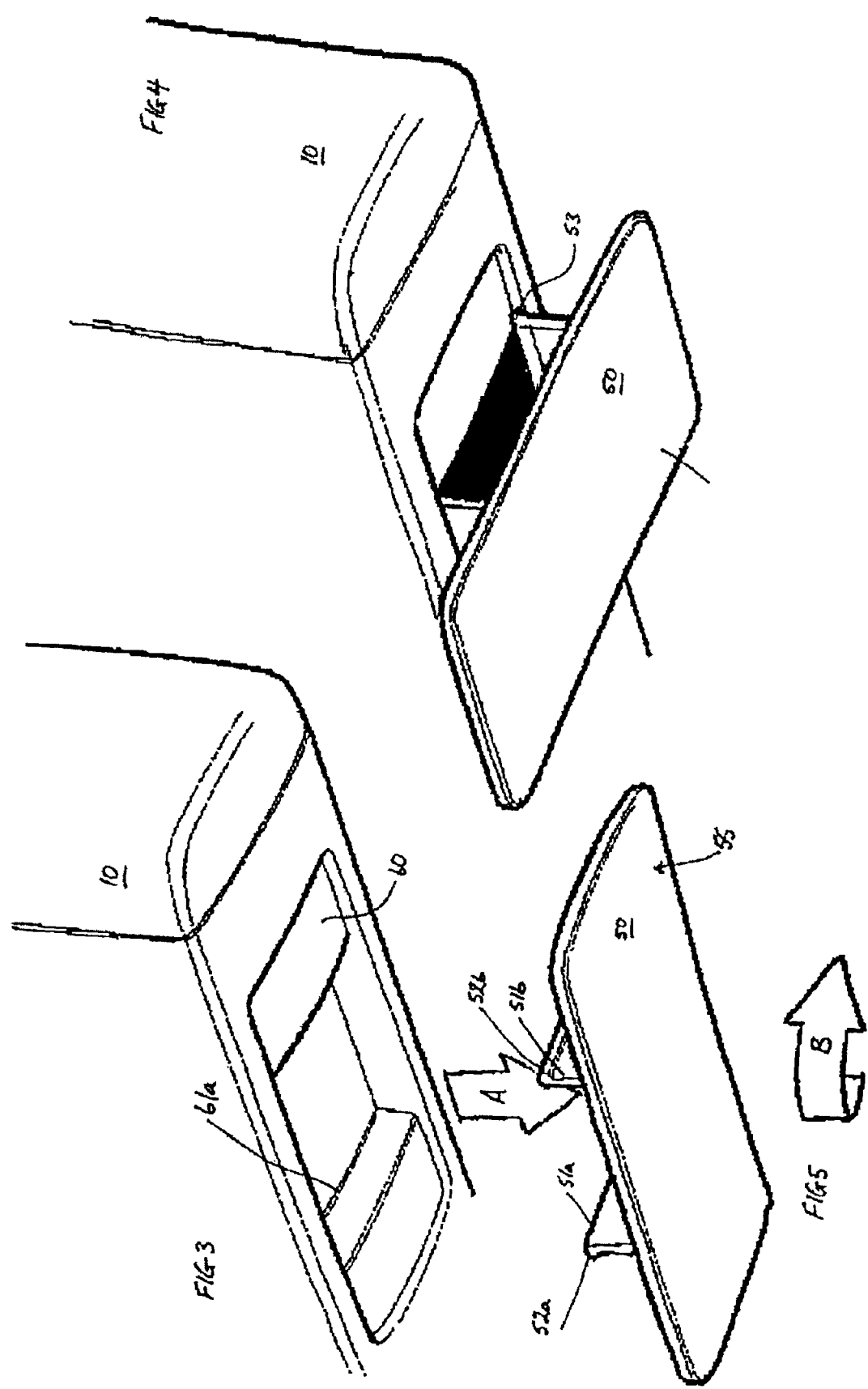

STABILIZER MECHANISMS FOR COMPUTER RELATED EQUIPMENT

TECHNICAL FIELD

The present invention relates to mechanisms for mounting and/or stabilizing computers and computer related hardware.

BACKGROUND ART

Traditional designs for computer related equipment, e.g., personal computers, have evolved from the "standard" personal computer, exemplified by the IBM-AT, to small form-factor personal computers (PCs) such as the e-PC manufactured by Hewlett Packard Company. This design development has resulted in many innovative and creative designs reflecting the acceptance of such hardware in the business and home environments. This evolution in design has also been influenced by aesthetic considerations which were previously considered secondary to the basic task of housing the internal computer hardware in a functional casing unit.

Early types of personal computers were generally characterized by horizontally mounted motherboards resulting in a low case profile with a relatively large footprint. This was necessitated by the PC case needing to be sufficiently large to accommodate a motherboard, disk drives, power supplies etc. Early expansion board topologies reinforced the popularity of this type of case construction. However such designs consumed a significant amount of desk or floor space and a number of design solutions were proposed to reduce the PC footprint.

Early adaptations of known PC designs aimed at reducing the PC footprint included mounting the PC case on its side. Such solutions often involved simply tilting a standard PC on its edge, or constructing the case and chassis in a vertical orientation. Designs of the latter type are referred to as "tower" configurations and sometimes involve the redesign of the internal hardware topology of the computer to accommodate this orientation.

A common problem with such configurations is that upright or slim line computer cases can be unstable and prone to tipping. This is particularly so if the computer is located on the floor or perhaps if additional hardware components, for example external disk drives etc, are located on top of the computer case.

Early simple solutions included providing a separate resilient plastic "foot" device in the form of a cradle into which an edge-mounted PC case was slid. Such designs are not ideal because PC cases come in a variety of dimensions and not all feet can accommodate every PC model. Other solutions include integrally molding an outwardly oriented flange or rim into the base of the tower case. Others include incorporating molded or extruded rails mounted along the edge of the computer casing to extend the footprint slightly. Such arrangements can increase the footprint and improve stability. However, they may not be ideal because they often do not provide sufficient stability and flexibility in terms of operating functions (cooling etc). These modifications can also interfere with aesthetic aspects of the casing as well as hamper the ability to quickly and easily reorient the computer in a horizontal or vertical position.

It is an object of the present invention to provide a new and improved structure for stabilizing a PC or computer equipment, which structure is aesthetically pleasing, non-intrusive, compact, solid, easy to retract/extend and allows through-wall cooling through the underside of a vertically mounted computer or hardware component casing.

DISCLOSURE OF THE INVENTION

One aspect of the invention relates to the combination of a casing for computer related equipment and a structure for enabling a bottom face of the casing to be at least partially elevated relative to a support surface for the bottom face while the computer related equipment is in use. The structure enables the casing to be stably mounted on the support surface while the casing is elevated. The structure has a shape and position causing the structure to extend beyond side walls of the casing while the structure elevates the casing to be stably mounted so the footprint of the casing while the computer related equipment is in use and the casing is elevated by the structure is greater than the footprint of the bottom face. The structure and casing are arranged so the casing receives the structure in a position between the sidewalls while the computer related equipment is not in use and the casing is not elevated by the structure so that the footprint of the casing is the same as the footprint of the bottom face.

In a first embodiment, the casing includes a recess for receiving and holding the structure while the casing is not elevated and while the casing is elevated. The structure is removable from the recess and is able to be positioned (1) in a first angular orientation while the casing is not elevated and (2) in a second angular orientation while the casing is elevated. The structure and recess are arranged so that (1) the structure, when received and held at the first orientation in the recess while the casing is not elevated has no effect on the casing bottom face footprint and (2) the structure, when received and held at the second orientation in the recess while the casing is elevated, includes (a) a bottom surface that is displaced away from the recess and casing bottom face and (b) portions on the structure bottom surface that extend beyond the side walls. The bottom surface of the structure is arranged to be supported by the support surface.

In a second embodiment, the casing carries the structure. The casing and structure are arranged so the structure is pivoted away from the casing bottom face while the casing is elevated. The structure is pivoted on the bottom face while the casing is not elevated. The structure includes a portion that is arranged to be remote from the bottom face while the casing is elevated. The portion of the structure carries a pair of feet that can extend beyond opposite walls of the casing at right angles to the casing bottom face while the casing is elevated. The feet are arranged to provide support for the casing while the casing is elevated.

In the second embodiment, an end of the structure remote from the casing bottom face and a portion of each of the feet preferably have co-planar surfaces for providing support for the casing while the casing is elevated on the support surface.

Another aspect of the invention relates to a stabilizing mechanism for a casing of computer related equipment. The mechanism includes a stabilizer arrangement adapted to be pivotally attached to a casing of the computer equipment. The stabilizer includes retractable extension arms which, in a stabilizing position of the casing, are extendable so that the effective footprint of the casing is increased. The retractable extension arms are retractable in a storage position. The stabilizer arrangement and the extension arms are arranged so that the arms are pivotable into a retraction position within the casing while the arms are retracted in the storage position.

The stabilizer arrangement, in the stabilized position, is preferably arranged to be pivoted into a position whereby the substantially downward weight of the casing prevents the stabilizer arrangement from pivoting back into the retraction position.

Preferably, the stabilizer arrangement is arranged to pivot in a plane which is substantially perpendicular to a pivot plane defined by the casing wall to which it is attached. The retractable extension arms are arranged to extend in a direction substantially perpendicular to the pivot plane.

The stabilizer mechanism preferably includes a panel having a proximal end attached to the casing by a hinge arrangement. The retractable extension arms are at a distal end of the panel. The retractable extension arms are usually spring biased for achieving the stabilizing position.

Preferably, the retractable extension arms include elongated pins adapted to be (1) biased out of apertures in the stabilizer arrangement in the stabilizing position, and (2) inserted into apertures in the stabilizer arrangement so that the stabilizer arrangement can be moved into the retraction position.

A further aspect of the invention concerns a stabilizing mechanism for a casing of computer related equipment. The mechanism includes a removable stabilizer arrangement adapted to be stored in a storage recess within the casing while the stabilizer arrangement is in a storage position. The stabilizer arrangement is arranged to be released form the recess and activated to a stabilizing position.

The stabilizer arrangement preferably includes an engagement structure adapted to be releasably engaged in the storage recess while the stabilizer arrangement is oriented in the storage position. The stabilizer arrangement is adapted to be released from the storage recess while in the stabilizing position.

Preferably, the engagement structure includes a pair of resilient members joined at proximal ends to an inside face of the stabilizing structure and includes a detent arrangement at distal ends shaped and oriented to engage with corresponding detent recesses located in the engagement recess when the stabilizing structure is in the storage position and in the stabilizing position. The stabilizing structure is typically rotatable through substantially 90 degrees between the storage position and the stabilizing position.

The stabilizing structure is preferably generally planar with dimensions such that when the stabilizing structure is in the stabilizing position, the effective footprint of the computer casing is increased and when the stabilizing structure is in the storage position, the stabilizing structure can be pushed into the storage recess and retained therein by an engagement mechanism which extends at substantially right angles therefrom and engages corresponding parts of the engagement surface. The storage recess is preferably shaped to receive the stabilizing structure when the stabilizing structure is in the storage position.

BRIEF DESCRIPTION OF THE DRAWINGS

The present invention will now be described by way of example only and with reference to the drawings in which:

FIG. 1 is a cut away view through a computer casing with a stabilizer arrangement in a retracted position and with retractable extension arms in the stored position;

FIG. 2 is a view of the underside of the computer casing of FIG. 1 with the stabilizer arrangement in a stabilizing position with retractable extension arms in the extended position;

FIG. 3 is a perspective view of an alternative embodiment of a computer stabilizing mechanism including a releasable stabilizer arrangement including a panel;

FIG. 4 is a view of an underside of the computer casing of FIG. 3, wherein the stabilizer arrangement is in a stabilizing position; and FIG. 5 is a perspective view of the releasable stabilizer panel of FIGS. 3 and 4.

DETAILED DESCRIPTION OF THE DRAWING

FIGS. 1 and 2 are views of a first embodiment of a position stabilizer arrangement for a computer casing 10, wherein stabilizer 11 is in a retracted storage position within the computer casing. The stabilizer 11 includes a unitary structure comprising plate 14 and tubes 8 and 9 that are at opposite ends of the plate and have parallel axes. A shaft (not shown) extends longitudinally through tube 8 along axis 13 and is captured in casing 10 to form a hinge mechanism that pivotally attaches plate 14 to computer-casing wall 12. In a preferred embodiment, tube 9 of the stabilizer 11 carries extension arms 16a and 16b, more clearly seen in FIG. 2. Arms 16a and 16b respectively include rods 17a and 17b and circular, disc shaped feet that are at the ends of the rods so the centers of the rods and feet are coincident. When stabilizer 11 is stowed in casing wall 12, arms 16a and 16b are retracted in tube 9 and the bottom exposed face of plate 14 is co-planar with the bottom face of wall 12. When stabilizer 11 is pivoted about axis 13 to extend approximately 90° relative to wall 12, compression spring 18 biases arms 16a and 16b beyond the side edges of plate 14, along the axis of tube 9. Thus, the bottom face of casing 10 is pivoted upward in response to plate 14 being pivoted and the casing position is stabilized by arms 16a and 16b extending beyond the edges of plate 14 and the walls of casing 10 which are perpendicular to wall 12. In the stabilized position shown in FIG. 2, the "effective footprint" of casing 10 is increased depending on the length of the arms 16a and 16b.

The effective footprint of the computer casing is defined as the effective "area" which is encompassed by the base of the computer where that area contributes to the stability of the computer. In the simplest case where no stabilizing mechanism is employed, the effective footprint is the area of the base of the computer casing, or side wall (e.g., wall 12) as the case may be, which rests on a support surface. In the prior art cases previously discussed, the effective area can be increased by, for example, the planar rotation of a support foot so that the foot extends outwardly from either side of the casing. This extension is referred to as extending the effective footprint in a direction substantially perpendicular to the front-back axis of the computer casing.

FIG. 1 is a cut away view of the stabilizing mechanism in a stowed position in casing 11. In the stowed position, the retractable extension rods 17a and 17b are pushed into the cylindrical apertures in the distal end 15 of stabilizer 11 and the stabilizer is pivoted about hinge axis 13 into the casing 10. The stabilizer 11 is retained within casing 10 by a releasable catch or similar structure (not shown). Similarly, retractable extension arms 16a and 16b are retained within the apertures in the distal end 15 of stabilizer 11 by a securing mechanism (not shown). The securing mechanism for arms 16a and 16b can be a resilient catch molded into the arm storage apertures which engage the opposite ends of arms 16a and 16b, where circular, disc shaped feet 19a and 19b are located. Preferably, the relative geometry of stabilizer 11 and casing 10 is such that stabilizer 11 is flush with the outer surface 12 of the casing 10 when the stabilizer is in the storage position shown in FIG. 1.

To stabilize the computer casing 10 while the bottom face of casing 10 is turned upwardly about an edge opposite from the edge close to axis 13, the stabilizer 11 is pivoted into a stabilizing position with respect to the computer casing. In this orientation, the stabilizer 11 is positioned so that the generally vertically directed weight of the computer casing 12 prevents the stabilizer 11 from pivoting back into the retracted position shown in FIG. 1. This can be effected by arranging the hinge or pivot mechanism located at the proximal end 14 of the stabilizer 11 to limit the degree of movement of the stabilizer 11 with respect to the casing outer wall 12. Suitable structures such as hinge limiting mechanisms are known in the molding and construction arts to accomplish this purpose, and are not discussed in detail.

Stabilizer 11 pivots in a plane which is substantially perpendicular to a plane defined by the computer casing wall 12 to which it is attached. The retractable extension rods 17a and 17b extend in a direction substantially perpendicular to the plane defined by the computer casing wall 12. This orientation for the retractable extension arms provides the largest effective footprint for a given length of retractable extension rods 17a and 17b, and thus enhances the stability of the computer casing 10 when the arms 16a and 16b are in the stabilizing position. Other relative orientations are feasible within the scope of the invention.

In the embodiment illustrated in FIGS. 1 and 2, the stabilizer is in the form of a panel or plate 14 which is attached to the computer casing at a proximal end of the plate 14 by a hinge arrangement and has a distal end 15, where retractable extension arms 16a and 16b are located. The retractable extension arms 16a and 16b are biased into the stabilizing (extended) position by springs 18. According to this construction, as soon as stabilizer 11 is pulled out of its storage recess in casing 10, the stabilizer pivots around the axis 13. Once the distal, or outer, end 15 is free from the storage recess, springs 18 pop the retractable extension arms 16a and 16b out of the apertures in stabilizer 11 into the extended stabilizing position.

In the embodiment shown, the retractable extension arms 16a and 16b are in the form of elongated rods or pins 17a and 17b having feet 19a and 19b. The presence of feet 19a and 19b causes a segment of the periphery of the retractable extension arms to be co-planar with the lower surface of the distal end 15 of the stabilizer 11 which rests on the support surface. This aids the sideways stability of the computer casing 10. Other designs are possible within the scope of the invention, such as incorporating rubber feet etc. The ends of arms 16a and 16b can also incorporate features which engage the inner wall of the storage recess in tube 9 so that the stabilizer is securely fastened in place for shipping. Similarly, the shape of the stabilizer 11 need not be a flat plate or panel. For example, stabilizer 11 can be generally Y or T-shaped with the retractable extension arms located at ends of the arms of the Y or T and the hinge being formed at the bottom of the base. Also, depending on the desired elevation of the computer casing, the distance between the distal and proximal ends of plate 14 of the stabilizer 11 can be increased or decreased.

A second embodiment of a stabilizing mechanism for computer casing 10 is shown in FIGS. 3 to 5. This embodiment includes a releasable and removable stabilizer 50 which is constructed to be contained in a storage recess 60 in a retracted position within the computer casing 10. In the preferred configuration shown, the stabilizer 50 includes a plate or panel member 55 which forms part of the outer casing wall when the stabilizer is retracted into the casing. In the stabilizing position (shown in FIG. 4), the stabilizer 50 releasably engages the inside of the storage recess 60 so that the elongated directions of wall 12 and panel 55 are the same. In the illustrated embodiment, this corresponds to a relative orientation of 90 degrees between the storage position and stabilizing orientation of stabilizer 50.

The stabilizer 50 includes an engagement structure adapted to releasably engage with storage recess 60 in wall 12 when the stabilizing means 50 is in the storage position of FIG. 3 and the stabilizing position of FIG. 4.

In the embodiment shown, the engagement structure includes a pair of resilient panel members 51a and 51b having proximal edges (not visible in the Figures) connected to the inner face of panel 55. Members 51a and 51b have distal edges where detents 52a and 52b are located. Detents 52a and 52b are shaped and oriented to engage with corresponding detent recesses or slots 53 (see FIG. 4) located in the engagement recess 60. In the present embodiment, the engagement structure includes two opposing flat panels joined at their edges to the inside surface of plate 55. Alternative embodiments include two or more thinner flat members replacing the single panel member 55 shown in FIGS. 3 to 5. The viability of this construction depends on the required strength of the components of the engagement structure, the resilience of the components and the anticipated weight that the components need to support.

To position and secure stabilizer 50 in the support position, the stabilizer 50 is pulled out of the storage recess 60 in the direction shown by the letter A. Stabilizer 50 is then rotated through 90 degrees as shown by the letter B and re-inserted into the storage recess 60. The detents 52a and 52b have the same spacing as opposite detent recesses located inside or adjacent the inner lip of the storage recess 60 as shown in FIG. 4 so stabilizer 50 is firmly held in situ in recess 60 such that panel members 51a and 51b depend from wall 12 and a bottom face of panel 55 is positioned in a plane parallel to wall 12.

In the embodiment illustrated, the resilient members 51a and 51b forming the engagement structure are molded from plastic. Thus, members 51a and 51b "spring" into engagement when the stabilizer structure 50 is pushed into the storage recess 60 in the orientation shown in FIG. 4 and the detents 52a and 52b are in registration with the detent recesses 53.

As shown in FIGS. 3–5, the preferred construction includes a stabilizer structure 50 which is generally planar and has dimensions such that when structure 50 is in the stabilizing position illustrated in FIG. 4, the effective footprint of the computer casing 10 is increased. When stabilizer structure 50 is stored in casing 10, it is pushed into the storage recess 60 and retained therein by detents 52a and 52b of engagement structures 51a and 51b engaging similarly located detent recesses 61a and 61b in the inside of the recess 60.

The storage recess 60 is shaped to receive the stabilizer structure 50 in both the storage and stabilizing position. As noted above, recess 60 includes a further pair of detent recesses 61a and 61b which are located in the storage recess 60 toward the roof of the recess, i.e., in the part of recess 60 that is relatively remote from wall 12. Detent recesses 61a and 61b are oriented and arranged to capture the detents 51a and 51b when the stabilizer structure 50 is pushed fully into the storage recess 60. This engagement (i.e., capturing) action retains stabilizer 50 in the recess 60 for transport, shipping or when the computer casing 10 is stored in an orientation where stabilizing is not necessary.

Variants of recesses 61a and 61b include providing recess 60 with finger slots or cuts (not shown). This modification assists the user in extracting the stabilizer structure 50 from the casing 10. To this end, stabilizer structure 50 is constructed such that the detents and recess are relatively easily engaged and disengaged by simply pulling or pushing the stabilizer structure 50 into or out of the storage recess.

To increase the supporting strength of the stabilizing mechanism, the interior of storage recess 60 can include a lip or step adjacent the detent recesses 53 so that the weight of casing 10 and the computer contents thereof is not supported entirely by the engagement of the detents 52*a* and 52*b* and recesses 53*a* and 53*b*. For example, the distal ends of the engagement members 51*a* and 51*b* can bear against a solid piece of molding or part of the casing wall 12 when the stabilizer structure 50 is oriented at 90 degrees to the front-back axis of the casing. Other modifications to effect this variation are possible. Other possible modifications include forming the stabilizer structure with a different shape, e.g., with tapering distal ends or some other shape. Similarly, the engagement panels can be angled to the base of the stabilizer structure instead of being at right-angles.

Thus it can be seen that the present invention provides for aesthetically appealing and compact designs for a position stabilizing mechanism for a casing of computer related equipment. The mechanism is readily adaptable to modification to satisfy different designs and appearances. Multiple stabilizing mounts can be used in a single casing and the mechanism can also be applied to differently shaped and oriented computer related casings. The mechanism also prevents accidental loss of the stabilizer structure, for example in transit or shipping. The construction is particularly simple and effective.

Although the invention has been described by way of example and with reference to particular embodiments it is to be understood that modification and/or improvements may be made without departing from the scope of the appended claims.

Where in the foregoing description reference has been made to integers or elements having known equivalents, then such equivalents are herein incorporated as if individually set forth.

What is claimed is:

1. A stabilizing mechanism for a casing of computer related equipment including:
    a removable stabilizer arrangement adapted to be stored in a storage recess within the casing while the stabilizer arrangement is in a storage position, the stabilizer arrangement being arranged to be released from the recess and oriented to a stabilizing position, the stabilizer arrangement including an engagement structure adapted to be releasably engaged in the storage recess while the stabilizer arrangement is oriented in the storage position, the stabilizer arrangement being adapted to be released from the storage recess while in the stabilizing position, and the engagement structure including a pair of resilient members joined at proximal ends to an inside face of the stabilizing structure and including a detent arrangement at distal ends shaped and oriented to engage with corresponding detent recesses located in the engagement recess when the stabilizing structure is in the storage position and in the stabilizing position.

2. A stabilizing mechanism as claimed in claim 1 wherein the stabilizing structure is rotatable through substantially 90 degrees between the storage position and the stabilizing position.

3. A stabilizing mechanism as claimed in claim 2 wherein the storage recess is shaped so as to receive the stabilizing structure therein when in the storage position.

4. A stabilizing mechanism as claimed in claim 2 wherein the stabilizing structure is generally planar with dimensions such that when the stabilizing structure is in the stabilizing position, the effective footprint of the computer casing is increased and when the stabilizing structure is in the storage position, the stabilizing structure can be pushed into the storage recess and retained therein by an engagement mechanism which extends at substantially right angles therefrom and engages corresponding parts of the engagement surface.

5. A stabilizing mechanism as claimed in claim 1 wherein the stabilizing structure is generally planar with dimensions such that when the stabilizing structure is in the stabilizing position, the effective footprint of the computer casing is increased and when the stabilizing structure is in the storage position, the stabilizing structure can be pushed into the storage recess and retained therein by an engagement mechanism which extends at substantially right angles therefrom and engages corresponding parts of the engagement surface.

6. A stabilizing mechanism as claimed in claim 5 wherein the stabilizing structure is rotatable through substantially 90 degrees between the storage position and the stabilizing position.

7. A stabilizing mechanism as claimed in claim 1 wherein the storage recess is shaped so as to receive the stabilizing therein when in the storage position.

8. A computer casing including the stabilizing mechanism claimed in claim 1.

9. In combination, a casing for computer related equipment, a structure for enabling a bottom face of the casing to be at least partially elevated relative to a support surface for the bottom face while the computer related equipment is in use, the structure enabling the casing to be stably mounted on the support surface while the casing is elevated, the structure having a shape and position causing the structure to extend beyond side walls of the casing while the structure elevates the casing to be stably mounted so the footprint of the casing while the computer related equipment is in use and the casing is elevated by the structure is greater than the footprint of the bottom face, the structure and casing being arranged so the casing receives the structure in a position between the side walls while the computer related equipment is not in use and the casing is not elevated by the structure so that the footprint of the casing is the same as the footprint of the bottom face.

10. The combination of claim 9 wherein the casing includes a recess for receiving and holding the structure while the casing is not elevated and while the casing is elevated, the structure being arranged to be removable from the recess and being able to be positioned in a first angular orientation while the casing is not elevated and in a second angular orientation while the casing is elevated, the structure and recess being arranged so that (a) the structure, when received and held at the first orientation in the recess while the casing is not elevated, has no effect on the casing bottom face footprint and (b) the structure, when received and held at the second orientation in the recess while the casing is elevated, includes (i) a bottom surface that is displaced away from the recess and casing bottom face and (ii) portions on the structure bottom surface that extend beyond the side walls, the bottom surface of the structure being arranged to be supported by the support surface.

11. The combination of claim 9 wherein the casing carries the structure and the casing and structure are arranged so the structure is pivoted away from the bottom face while the casing is elevated and the structure is pivoted on the bottom face while the casing is not elevated, the structure including a portion that is arranged to be remote from the bottom face while the casing is elevated, the portion of the structure carrying a pair of feet that can extend beyond opposite walls of the casing at right angles to the casing bottom face while the casing is elevated, the feet being arranged to provide support for the casing while the casing is elevated.

12. The combination of claim 11 wherein an end of the structure remote from the casing bottom face and a portion of each of the feet have co-planar surfaces for providing support for the casing while the casing is elevated on the support surface.

* * * * *